United States Patent [19]
Morimoto

[11] Patent Number: 6,121,982
[45] Date of Patent: Sep. 19, 2000

[54] IMAGE FORMING APPARATUS

[75] Inventor: Ken-ichi Morimoto, Nara, Japan

[73] Assignee: Sharp Kabushiki Kaisha, Osaka, Japan

[21] Appl. No.: 09/500,280

[22] Filed: Feb. 8, 2000

Related U.S. Application Data

[62] Division of application No. 08/433,040, May 3, 1995.

[30] Foreign Application Priority Data

Jul. 5, 1994 [JP] Japan ..................................... 6-153846

[51] Int. Cl.⁷ .............................. B41J 2/385; G03G 13/04
[52] U.S. Cl. ........................................... 347/131; 358/448
[58] Field of Search ..................................... 347/129, 131, 347/237, 247; 358/443, 447, 448, 456, 459

[56] References Cited

U.S. PATENT DOCUMENTS

| | | |
|---|---|---|
| 5,231,519 | 7/1993 | Koike . |
| 5,321,432 | 6/1994 | Ishikawa et al. ..................... 347/131 |
| 5,327,256 | 7/1994 | Kang et al. ..................... 358/447 X |
| 5,327,524 | 7/1994 | Ng ..................... 358/448 |
| 5,333,039 | 7/1994 | Sagara ..................... 347/131 |
| 5,337,258 | 8/1994 | Dennis . |
| 5,408,338 | 4/1995 | Koike ..................... 358/456 |
| 5,486,927 | 1/1996 | Koizumi et al. ..................... 347/131 |

FOREIGN PATENT DOCUMENTS

| | | |
|---|---|---|
| 0296835A | 12/1988 | European Pat. Off. . |
| 0388833A | 9/1990 | European Pat. Off. . |
| 0465943A | 1/1992 | European Pat. Off. . |
| 1-218841 | 9/1989 | Japan . |
| 3-129392 | 6/1991 | Japan . |
| 4-223423 | 8/1992 | Japan . |
| 4-287566 | 10/1992 | Japan . |
| 6-133152 | 5/1994 | Japan . |
| WO-9317399A | 9/1993 | WIPO . |

*Primary Examiner*—Sandra Brase
*Attorney, Agent, or Firm*—Dike, Bronstein, Roberts & Cushman, LLP; David G. Conlin; David A. Tucker

[57] ABSTRACT

An image forming apparatus converts image data with recording density of 600 dpi which have been created in a host computer so that recording density in a vertical scanning direction is 300 dpi and recording density in a horizontal scanning direction is 1200 dpi, and outputs the converted image data to an optical system of a printer engine synchronizing with a clock frequency which is four times a normal clock frequency so as to form an image. As a result, the recording density in the horizontal scanning direction is not converted so as to be equal to the recording density in the vertical scanning direction in a conventional way, but is converted so as to have higher resolution. Therefore, an image with more improved printing quality than a conventional one can be formed by using a laser printer which can be arranged at a comparatively low price.

8 Claims, 10 Drawing Sheets

HORIZONTAL SCANNING DIRECTION

VERTICAL SCANNING DIRECTION

IMAGE FORMING APPARATUS

This is a divisional application of U.S. patent application Ser. No. 08/433,040, filed May 3, 1995, by K. Morimoto. for "IMAGE FORMING APPARATUS".

FIELD OF THE INVENTION

The present invention relates to an image forming apparatus for forming an image while a recording apparatus such as a laser printer is being connected to a data processor such as a host computer.

BACKGROUND OF THE INVENTION

It is necessary that a recording apparatus such as a laser printer provides high quality of an image, namely, extremely high resolution. In order to satisfy this need, the following method has been suggested. When recording data of 300 dpi, for example, created in a data processor, such as a host computer, are inputted to a recording apparatus of 300 dpi, the recording data are temporarily recorded at resolution of 600 dpi by compensating a size, position, etc. of dots.

Meanwhile, in recent years, a tendency to high resolution of a recording apparatus has been remarkable. For example, in order to form an image at high resolution of 600 dpi, a recording apparatus having resolution of 600 dpi is connected to a host computer for creating recording data with recording density of 600 dpi so as to constitute a system as an image forming apparatus. Furthermore, an arrangement of a system which responds to a resolution of not less than 600 dpi is adopted.

However, as to a recording apparatus, the higher its resolution becomes, the more expensive its price becomes. for this reason, a system may be arranged such that a laser printer with resolution of 300 dpi is connected to a host computer for creating recording data at recording density of 600 dpi, for example, so as to form an image.

With such a system arrangement, when recording data with recording density of 600 dpi, for example, are simply recorded in a recording apparatus with resolution of 300 dpi, a size of an image doubles in length and breadth.

Therefore, for example, Japanese Unexamined Patent Publication No. 4-287566/1992 (Tokukaihei 4-287566) discloses an apparatus having a function that an image signal is converted according to a difference in resolution of a recording apparatus. With this function, when recording data created at high recording density of 600 dpi, for example, are thinned out so as to have recording density of 300 dpi, the thinned out recording data are outputted to a recording apparatus with resolution of 300 dpi so as to be recorded.

Here, an arrangement and an operation of a laser printer will be explained as one example of a recording apparatus referring to FIGS. 2 and 3 which are explanatory drawings of the present invention. First, as shown in FIG. 3, a laser beam emitted from a semiconductor laser 21 which is turned ON/OFF according to recording data is reflected successively by a polygon mirror 24 which is rotated and a reflecting mirror 28 so as to be irradiated on a surface of a photoreceptor drum 4.

At this time, when the polygon mirror 24 is rotated, the laser beam is scanned parallel to a center of the photoreceptor drum 4 and an electrostatic latent image according to recording data for 1 line is formed along the scanning direction, namely, a horizontal scanning direction according to ON/OFF operation of the semiconductor laser 21. Meanwhile, the photoreceptor drum 4 is also rotated in synchronization with the rotation of the polygon mirror 24. As a result, the electrostatic latent images by scanning of every one line are successively formed in a direction in which the photoreceptor 4 rotates, namely, a vertical scanning direction.

Figure 2:
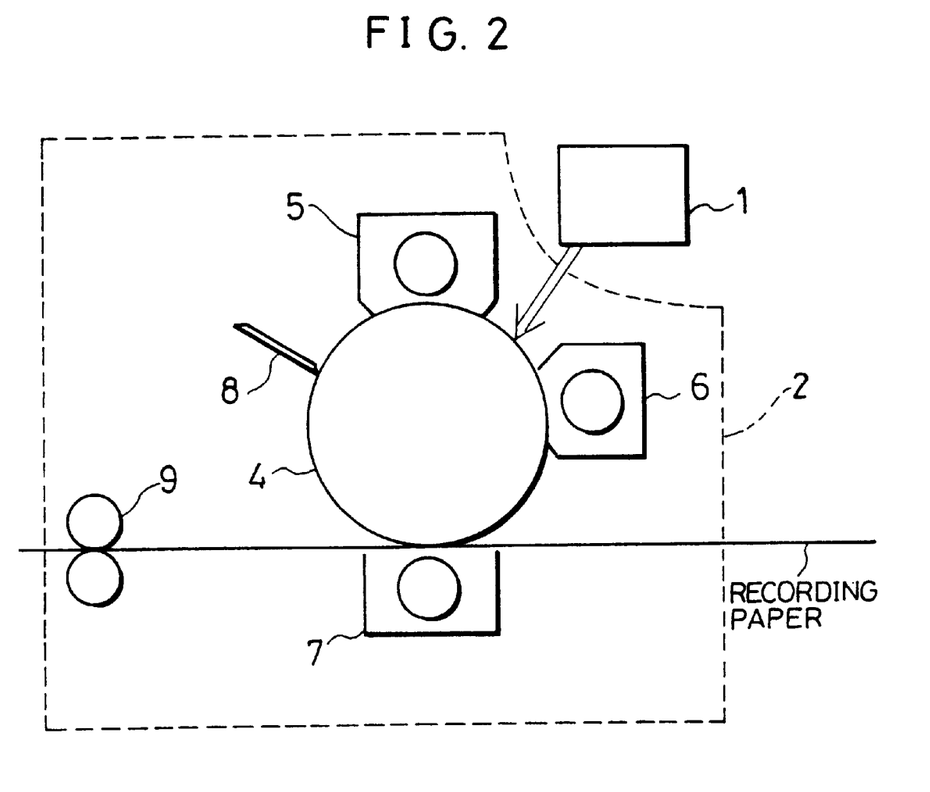
FIG. 2 is a schematic cross section which shows an arrangement of a main section of a laser printer as the above apparatus.
Figure 3:
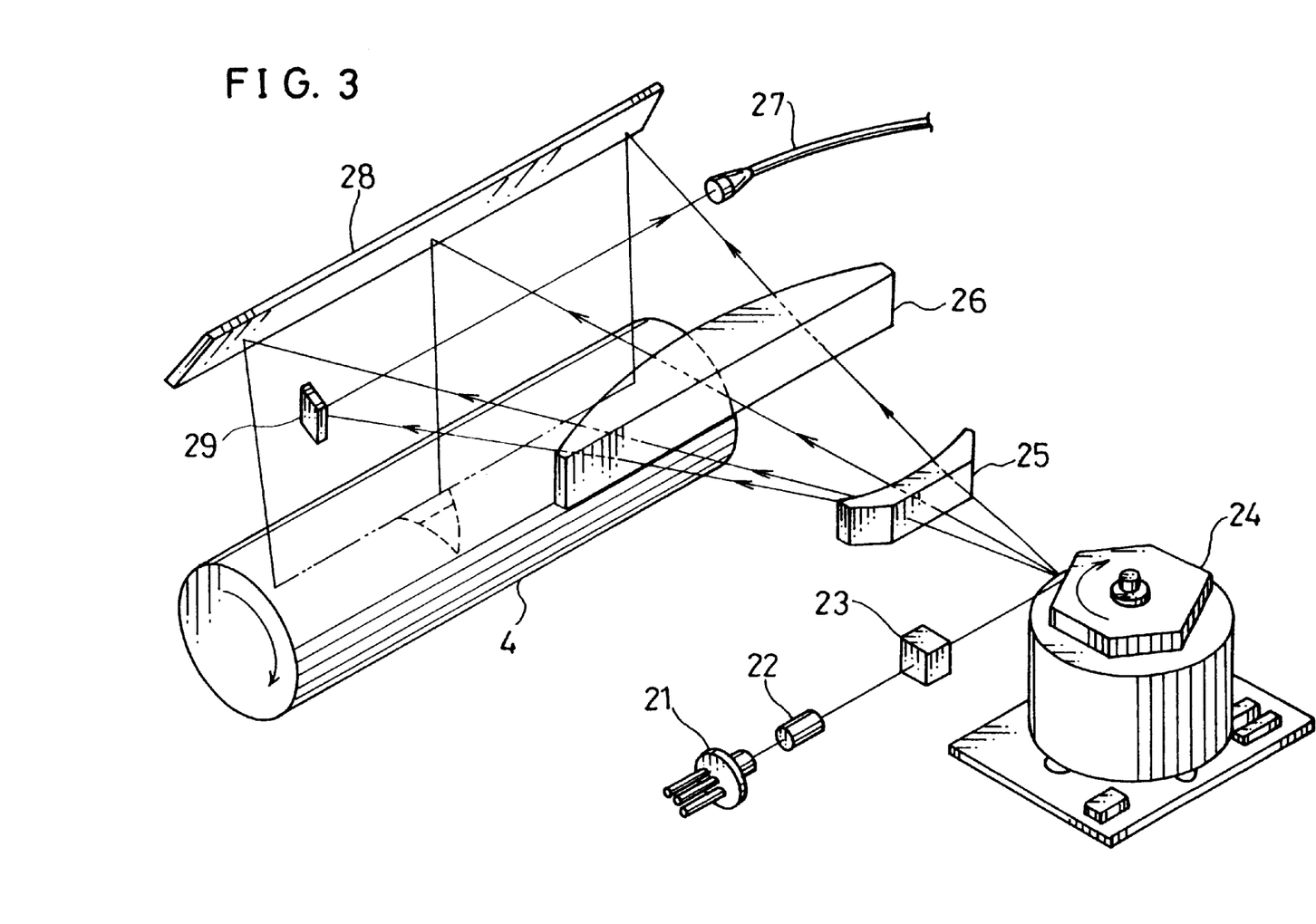
FIG. 3 is a perspective view which shows an arrangement of an optical system in the laser printer.

In such a manner, as shown in FIG. 2, the electrostatic latent image, which is formed on the surface of the photoreceptor drum 4 according to the recording data, is developed by toner in the developing unit so as to be visualized. Then, the toner image is transferred on recording paper and is fixed by a fixing unit 9 so that the image according to the recording data is formed on the recording paper.

Resolution of such a laser printer is determined by specification of an apparatus, such as a line space in the vertical scanning direction, namely, a rotating speed of the polygon mirror 24, a rotating speed of the photoreceptor drum 4 synchronized with the rotating speed of the polygon mirror 24. In the case where resolution in the vertical scanning direction is 300 dpi, resolution in the horizontal scanning direction, namely, a clock frequency of an optical system for turning CN/OFF the semiconductor laser 21 has been set such that the resolution in the horizontal scanning direction is equal to the resolution in the vertical scanning direction.

However, for example, in the case where in order to record recording data of 600 dpi in a laser printer with resolution of 300 dpi which is same as the above arrangement, the recording data are thinned out based upon a function for converting an image signal in the apparatus disclosed in the above-mentioned Publication, for example, an amount of data in the vertical scanning direction as well as an amount of data in the horizontal scanning direction are thinned out to ½. For this reason, an amount of data to be actually contributed to image formation in an amount of preliminarily created data responding to high resolution is greatly decreased, and as a result, an outline of an image, or a character, becomes jagged, thereby remarkably lowering printing quality.

SUMMARY OF THE INVENTION

It is a first object of the present invention to provide an image forming apparatus which is capable of preventing deterioration in printing quality when an image is formed at low recording density from image data with high recording density.

It is a second object of the present invention to make it possible to lower costs of an apparatus and prevent deterioration in printing quality in an image forming system for forming an image where a data processor for creating image data with high recording density is connected to an image printer for forming an image at low recording density.

In order to achieve the first object, an image forming apparatus of the present invention is characterized by including:

an electrophotography processing section for forming an image based upon image data;

image data converting means for converting when recording density of image data is first recording density and the recording density in a vertical scanning direction in the electrophotography processing section is second recording density which is lower than the first recording density, converting recording density of the image data in the vertical scanning direction into the second recording density prior to image formation and for converting recording density in a horizontal scanning direction into third recording density which is higher than the first recording density; and speed controlling means for adjusting a dot formation speed in the horizontal scanning direction in the electrophotography processing section according to the third recording density.

With the above arrangement, when an image is formed from image data with the first recording density (600 dpi, for example) in the electrophotography processing section where the recording density in the vertical scanning direction is the second recording density (300 dpi, for example), prior to image formation, the image data are converted so that the recording in the vertical scanning direction becomes the second recording density (300 dpi) and the recording density in the horizontal scanning direction becomes the third recording density (1200 dpi, for example). As a result, even when an image is formed in the electrophotography processing section where its recording density is lower than the recording density of the image data, decrease in a number of dots in the image can be suppressed. As a result, decrease in an amount of information is suppressed, thereby making it possible to prevent deterioration in printing quality. Furthermore, the image is prevented from being enlarged in the horizontal scanning direction at the time of forming the image by adjusting a dot formation speed in the horizontal scanning direction at the time of forming the image accordingly to the third recording density (1200 dpi), thereby making it possible to form a proper image.

In addition, in the case where the image data converting means multiplies recording density of image data in the vertical scanning direction by 1/n so as to convert it into the first recording density, with the arrangement which increases the recording density in the horizontal scanning direction by a factor n so as to convert it into the third recording density, since a number of dots in an image do not change before and after conversion, an amount of information does not decrease, thereby making it possible to more efficiently prevent deterioration in printing quality.

Here, in order to convert the recording density of the image data, the image data converting means may be arranged so as to preliminarily store a converting rule. The converting rule is a rule for converting a dot pattern composed of n dots in the vertical scanning direction m×dots (m≧1) in the horizontal scanning direction into a dot pattern composed of 1 dot in the vertical scanning direction×(m×n) dots in the horizontal scanning direction. This makes it possible to convert the recording density of the image data in the vertical scanning direction into recording density which is 1/n times the recording density and the recording density in the horizontal scanning direction into n times the recording density.

In addition, the converting rule may also make a ratio of 2(m+n) kinds of first dot patterns composed of n dots in the vertical scanning direction×m dots in the horizontal scanning direction to 2(m+n) kinds of second dot patterns composed of 1 dot in the vertical scanning direction×(m×n) dots in the horizontal scanning direction become 1:1.

In addition, the converting rule may also make it possible to convert the dot pattern before conversion into a dot pattern having a same number of printing dots as of printing dots in the dot pattern before conversion as a dot pattern after conversion. As a result, even when an arrangement of printing dots changes before and after conversion, a number of printing dots does not change, thereby making it possible to prevent deterioration in printing quality due to lack of printing dots. Moreover, disappearance of a singular point due to lack of printing dots is prevented, thereby making it possible to form an image which is faithful to image data.

In addition, in order to achieve the second object, an image forming system is characterized by including:

a data processor for creating image data; and an image printer for forming an image, wherein when recording density at the time of creating the image data is first recording density and recording density in a vertical scanning direction in the image printer is second recording density, the data processor includes image data converting means for converting the recording density of the image data in the vertical scanning direction into the second recording density and for converting recording density in a horizontal scanning direction into third recording density which is higher than the first recording density, wherein the image printer includes a speed adjusting means for adjusting a dot formation speed in the horizontal scanning direction at the time of forming an image according to the third recording density.

In this way, when recording density is converted in the data processor, it is possible to prevent deterioration in printing quality and to decrease burden of the image printer. Moreover, it is not necessary to specially provide an exclusive memory, etc. for converting image data in an image printer. As a result, in the case of a system arrangement that a plurality of image printers are connected to a data processor, such as a host computer, respective image printers can be provided at a low price, thereby making it possible to lower whole cost of an apparatus.

In addition, the data processor may include compressing/transmitting means, and the compressing/transmitting means compresses image data where its recording density has been converted by the image data converting means so as to transmit the compressed image data to the image printer. At the same time, when the image printer is arranged so as to include expanding means for expanding the compressed image data so as to return it to a state before compression, a time required for transmission from the data processor to the image printer can be shorten, and also capacity of a memory in the storing means for temporarily storing the image data received in the image printer can be small. As a result, whole cost of an apparatus can be further lowered.

In addition, an image forming system may be also characterized by including:

a data processor for creating image data; and an image printer for forming an image, wherein when recording density at the time of creating the image data is first recording density and recording density in a vertical scanning direction in the image printer is second recording density, the image printer includes:

image data converting means for converting the recording density of the image data in the vertical scanning direction into the second recording means and for converting recording density in a horizontal scanning direction into third recording density which is higher than the first recording density prior to forming an image; and speed adjusting means for adjusting a dot formation speed in the horizontal scanning direction at the time of forming an image according to the third recording density.

For fuller understanding of the nature and advantages of the invention, reference should be made to the ensuing detailed description taken in conjunction with the accompanying drawings.

BRIEF DESCRIPTION OF THE DRAWINGS

FIGS. 4 show converting processes of image data in the above apparatus:

FIGS. 7 show recording dots to be formed by converting dot data at recording density of 600 dpi×600 dpi which correspond to an inclined line section:

FIGS. 8 show recording dots formed by converting dot data with a singular point at recording density of 600 dpi×600 dpi:

FIGS. 9 show recording data formed by converting dot data corresponding to an acute angle section at recording density of 600 dpi×600 dpi:

DESCRIPTION OF THE EMBODIMENTS

EMBODIMENT 1

The following will discuss one embodiment of the present invention referring to FIGS. 1 through 9.

First, a whole arrangement and an operation of a laser printer as a recording apparatus of the present embodiment will be explained referring to FIGS. 2 and 3.

As shown in FIG. 2, the laser printer includes an optical system 1 and a processing section 2. The processing section 2 is provided with a photoreceptor drum 4 which is rotated. A charger 5 for charging a surface of the photoreceptor 4, a developer unit 6 for developing an electrostatic latent image on the surface of the photoreceptor drum 4 which is formed by the optical system 1, mentioned later, using toner so as to visualize it as a toner image, a transfer unit 7 for transferring the toner image onto recording paper fed from a feeding system, not shown, a fixing unit 9 for fixing the toner image on the recording paper and a cleaning unit 8 for removing residual toner are positioned in this order on a periphery of the photoreceptor drum 4.

Meanwhile, as shown in FIG. 3, the optical system 1 includes a semiconductor laser 21 for emitting a laser beam, a collimator lens 22 for correcting a laser beam emitted from the semiconductor laser 21 to a parallel beam, a cylindrical lens 23 for converging the parallel beam, a polygon mirror 24 which is rotated so as to scan the converged laser beam in a direction parallel to a center of the photoreceptor drum 4, namely, a horizontal scanning direction, a spherical lens 25 and a toric lens 26 for imaging the laser beam reflected by the polygon mirror 24 on the surface of the photoreceptor drum 4, and a reflecting mirror 28 for reflecting the laser beam which has been transmitted through the toric lens 26 towards the photoreceptor drum 4. Moreover, an optical fiber 27 and a horizontally synchronizing mirror 29 for detecting a position of the laser beam reflected by the polygon mirror 24 are provided.

The following will discuss a recording operation in the laser printer with the above arrangement.

The semiconductor laser 21 is controlled as to ON/OFF operation by an image signal transmitted from a printer controller, mentioned later. When the semiconductor laser 21 is turned ON, a laser beam is emitted. The emitted laser beam is irradiated on the polygon mirror 24 through the collimator lens 22 and the cylindrical lens 23. The laser beam irradiated on and reflected by the polygon mirror 24 is scanned in the horizontal scanning direction by rotation of the polygon mirror 24 at a prescribed speed.

The laser beam scanned in the horizontal scanning direction in such a manner is converged through the spherical lens 25 to a beam diameter which is suitable for resolution of the laser printer, 300 dpi, for example. Thereafter, the laser beam goes through the toric lens 26 and the reflecting mirror 28 so as to be imaged on the surface of the photoreceptor drum 4.

The photoreceptor drum 4 is rotated synchronizing with the rotation of the polygon mirror 24, and the laser beam is irradiated on the surface of the photoreceptor drum 4 Which has been charged by the charger 5. As a result, an electrostatic latent image is formed on the surface of the photoreceptor drum 4.

The electrostatic latent image is formed on the surface of the photoreceptor drum 4 linearly along the horizontal scanning direction according to the rotation of the polygon mirror 24. More specifically, the electrostatic latent image is formed on one line as a dot line according to ON/OFF control of the semiconductor laser 21.

At the same time, since the photoreceptor drum 4 is rotated synchronizing with the rotation of the polygon mirror 24, the line-like electrostatic latent image is successively formed at predetermined intervals in the direction in which the photoreceptor drum 4 rotates, namely, the vertical scanning direction. As a result, the electrostatic latent image is formed on the surface of the photoreceptor drum 4 as a two-dimensional dot pattern.

Here, synchronization of rotation of the polygon mirror 24 and the photoreceptor drum 4 with the ON/OFF operation of the semiconductor laser 21 at the time of the above recording operation are actuated according to a detection timing of a laser beam which is reflected by the horizontal synchronizing mirror 29 and is detected through the optical fiber 27. Moreover, in the case where the resolution of the laser printer is 300 dpi, for example, a relationship in a rotating speed between the polygon mirror 24 and the photoreceptor drum 4 is set so that a line space to be formed on the surface of the photoreceptor drum 4 responds to 300 dpi.

The electrostatic latent image formed on the surface of the photoreceptor drum 4 in the above manner is visualized as a toner image in the developer unit 6. The visualized toner image is transferred on recording paper in the transferring unit 7 and is fixed on the recording paper in the fixing unit 9. The recording paper where the image has been formed is carried out of the laser printer by a recording paper carrying system, not shown.

Figure 1:
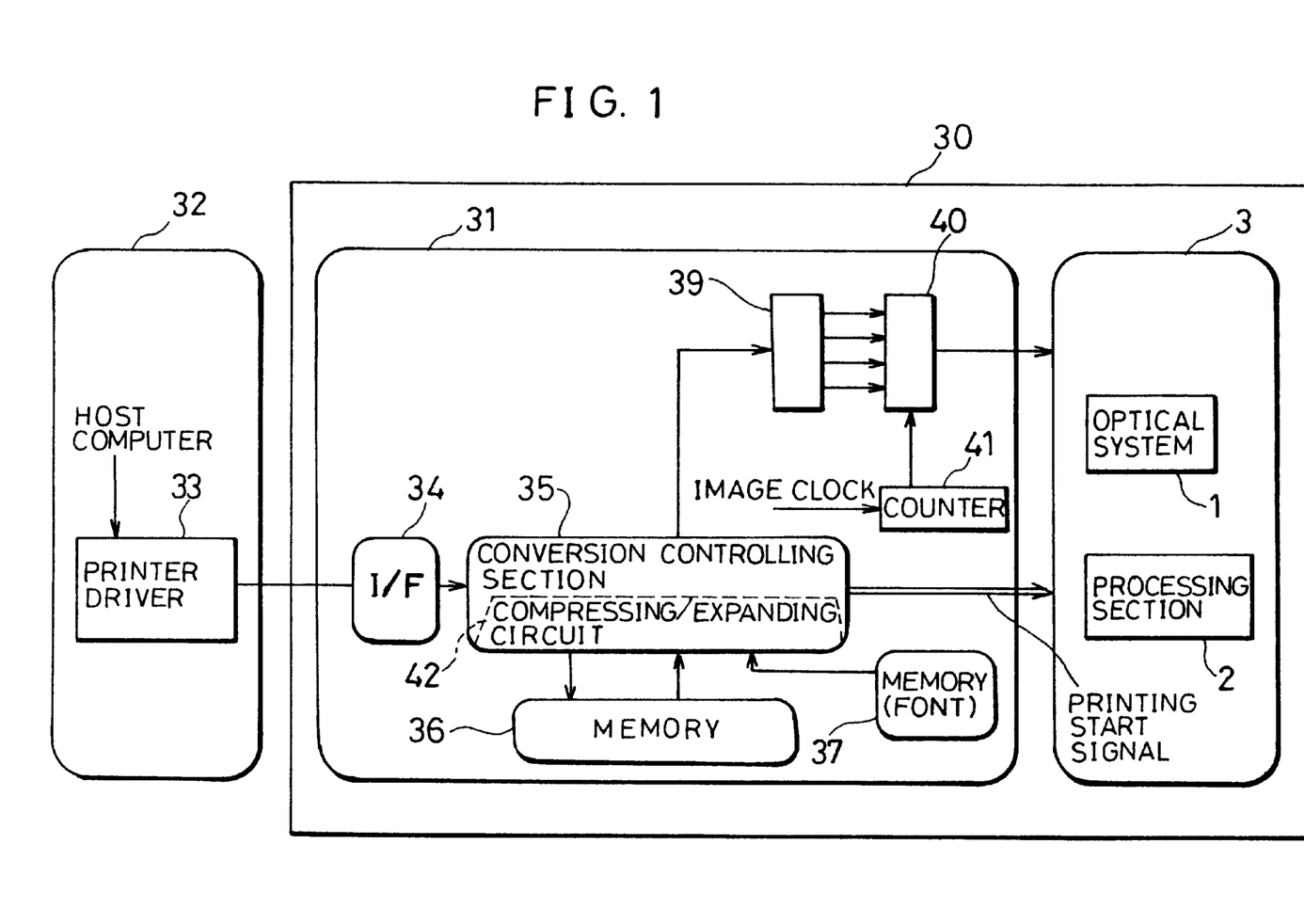
FIG. 1 is a block diagram which shows an arrangement of control in an image forming apparatus in one embodiment of the present invention.

The following will discuss a control arrangement in an image forming apparatus which is arranged such that the above-mentioned laser printer is connected to a host computer as a data processor referring to FIG. 1. Here, recording density of image data to be created in the host computer as a data processor (first recording density) is set as 600 dpi, and recording density in the vertical scanning direction in the laser printer (second recording density) is set as 300 dpi.

As shown in FIG. 1, a laser printer 30 includes a printer controller 31 as a control section for controlling a printer engine 3 which is composed of the above-mentioned optical system 1 and the processing section 2. A conversion controlling section 35 as image information converting means, which is connected to a printer driver 33 in the host computer 32 for creating image data responding to the recording density of 600 dpi, is provided in the printer controller 31.

When image data including code data are transmitted from the host computer 32 to the conversion controlling section 35, the conversion controlling section 35 converts the image data into dot data. Moreover, according to a conversion pattern, mentioned later, the conversion controlling section 35 converts the dot data into an output image signal in which recording density in the vertical scanning direction is 300 dpi which corresponds to the second recording density and recording density in the horizontal scanning direction (third recording density) is 1200 dpi so as to output the image signal.

In addition, a memory 36 as data storing means and a memory 37 where font has been preliminarily stored are connected to the conversion controlling section 35. Moreover, a compressing/expanding circuit 42 for compressing image data transmitted from the host computer 32 so as to store the compressed image data in the memory 36 and for expanding the compressed image data to be read out from the memory 36 into the original image data is installed in the conversion controlling section 35.

In addition, the printer controller 31 is provided with a data latch 39, a selector 40 and a counter 41 for successively outputting the output image signal which has been converted in the conversion controlling section 35 in synchronization with an operation in the printer engine 3.

The following will discuss processing operation of the image data in the above controlling arrangement.

First, code data C outputted from the host computer 32 are successively captured by the printer controller 31 through a printer driver 33 and an interface 34, and dot data D' on a whole page to be recorded are created in the conversion controlling section 35. After being compressed in the compressing/expanding circuit 42, the dot data D' are stored in the memory 36.

At this time, code data such as an outline font are compared with font data stored in the memory 37 so as to be converted into the dot data D'.

After writing of the compressed dot data D' into the memory 36 is completed, the conversion controlling section 35 outputs a printing start signal to the printer engine 3 and starts to warm up the printer engine 3. At the same time, the conversion controlling section 35 successively reads out the dot data D' from the memory 36, and the dot data D' are expanded in the compressing expanding circuit 42 so as to be converted according to procedures explained below.

In other words, the read-out dot data D' at this time have the same recording density (600 dpi×600 dpi) as that of the data created in the host computer 32. For this reason, when the dot data D' are directly transmitted to the printer engine 3 to be recorded at normal recording density (300 dpi×300 dpi), a size of its image becomes double in length and breadth.

Therefore, the dot data D' (600 dpi×600 dpi) is converted into dot data D in which recording density in a vertical scanning direction is reduced to half, namely, 300 dpi and recording density in a horizontal scanning direction is doubled, namely, becomes 1200 dpi. The following will discuss the conversion of data referring to FIGS. 4 and 5.

Figure 4A:
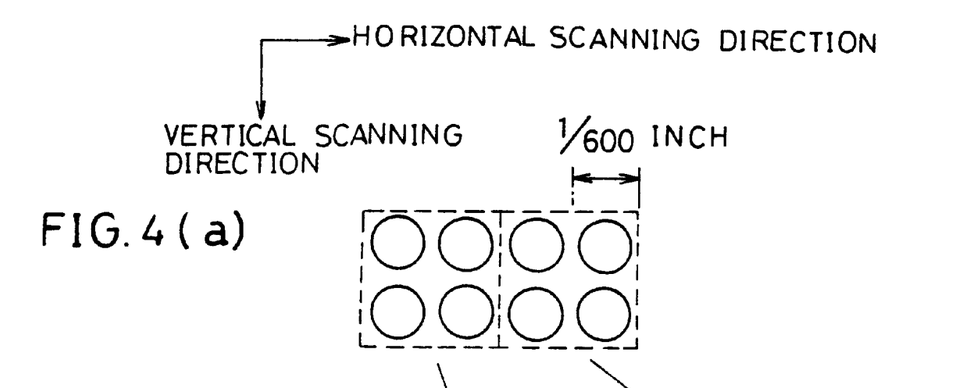
FIG. 4(a) is a schematic drawing which shows dot data with recording density of 600 dpi×600 dpi before conversion.

FIG. 4(a) shows a part of the dot data D' which have been read out from the memory 36 and been expanded, and in the drawing, one circle indicated by a solid line represents one dot (600 dpi).

Figure 4B:
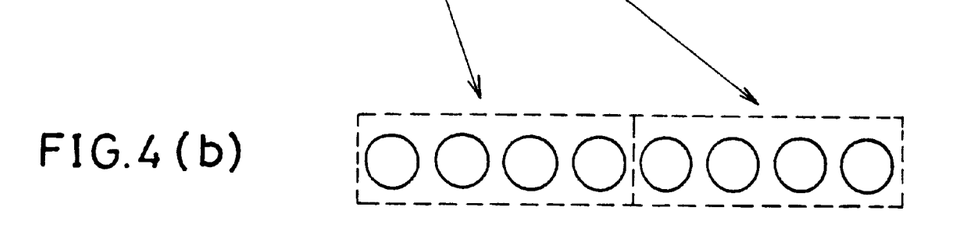
FIG. 4(b) is a schematic drawing which shows dot data with recording density of 300 dpi×1200 dpi after conversion.
Figure 5A:
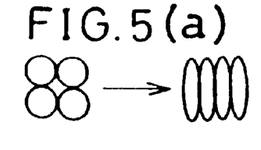
FIGS. 5(a) through 5(p) are schematic drawings which show a pattern where the dot data with recording density of 600 dpi×600 dpi are converted into dot data with recording density of 300 dpi×pseudo 1200 dpi.
Figure 5B:
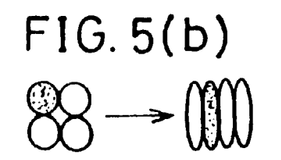
Figure 5C:
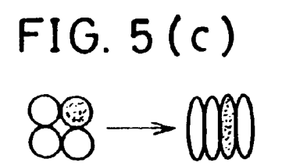
Figure 5D:
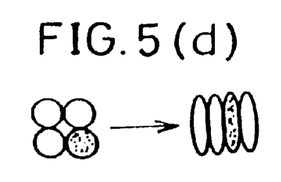
Figure 5E:
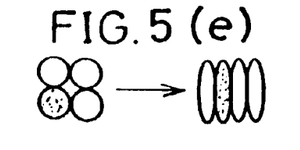
Figure 5F:
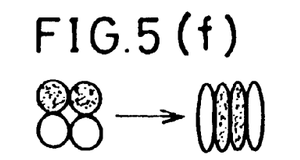
Figure 5G:
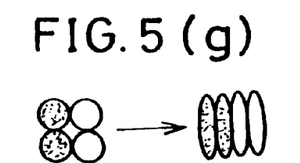
Figure 5H:
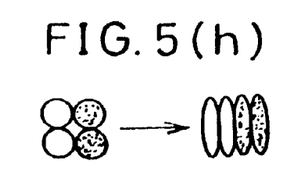
Figure 5I:
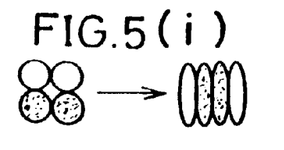
Figure 5J:
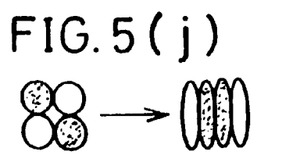
Figure 5K:
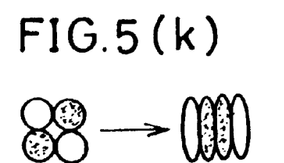
Figure 5L:
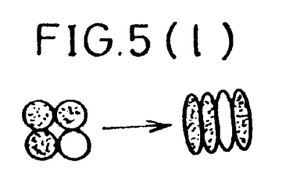
Figure 5M:
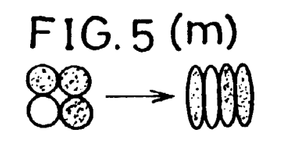
Figure 5N:
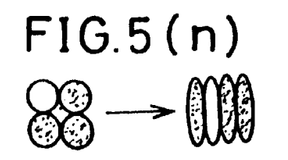
Figure 5O:
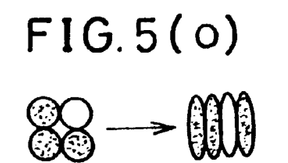
Figure 5P:
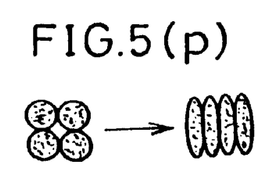

Here, as shown by the portion surrounded by broken lines, 4 dots (2 dots in the horizontal scanning direction×2 dots in the vertical scanning direction) are sampled as one group, and as shown in FIG. 4(b), the sampled 4 dots are converted into data of pseudo 1200 dpi in which 4 dots in the horizontal scanning direction×1 dot in the vertical scanning direction=4 dots according to sixteen kinds of conversion patterns shown in FIG. 5(a) through 5(p).

As to the above conversion, in FIG. 5(n), for example, when 2 dots on a first line at recording density of 600 dpi is represented by [0,1], and two dots on a second line is represented by [1,1], image data on a storage for 4 dots are converted into data of pseudo 1200 dpi in the horizontal scanning direction which is represented by [1,0,1,1]. In such conversion, a number of dots after and before conversion is same. Therefore, patterns of 4 dots before conversion has sixteen kinds, and a number of patterns after conversion is also set as sixteen correspondingly to each of sixteen kinds. Namely, the patterns before and after conversion are in the ratio 1:1.

After the conversion, a number of dots in the vertical scanning direction becomes half of the data of 600 dpi before conversion, and the recording density in the vertical scanning direction becomes 300 dpi which is same as the recording density of the laser printer. Meanwhile, a number of dots in the horizontal scanning direction becomes twice the data of 600 dpi before conversion.

For this reason, when the data are recorded at 300 dpi which is normal recording density in the printer engine 3, a size of an image becomes 4 times as large in the horizontal scanning direction.

Figure 6A:
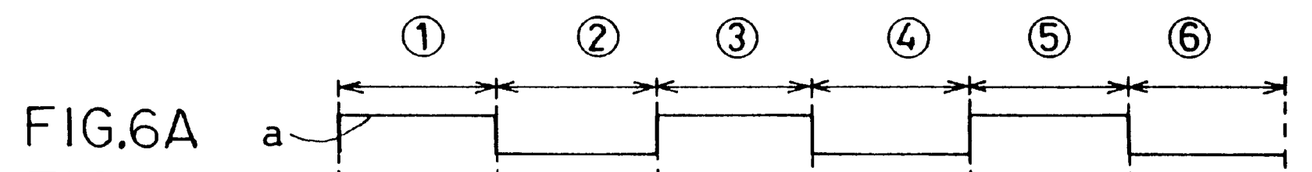
FIGS. 6A–6G are explanatory drawings which show a relationship among a synchronizing clock signal of transmission of image data to a printer engine, an image data signal and a dot pattern.

Therefore, the conversion controlling section 35 controls a frequency of clock at the time of transmitting the data to the printer engine 3 according to recording density in the horizontal scanning direction after conversion. This conversion will be explained referring to FIGS. 6A–6G. In FIG. 6A, a clock signal a is a synchronizing signal of image data transmission to the printer engine in the laser printer in the case where data are recorded at 300 dpi. A clock signal b is a synchronizing signal of image data transmission to the printer engine in the case where data is recorded at pseudo 1200 dpi. Signals c and d are image signals which represent a dot data row for two lines adjoining in the horizontal scanning direction in the image data of 600 dpi. Dot patterns e and f represent dots which are formed according to the signals c and d. Furthermore, a dot pattern g represents a dot which is formed based upon the example of the data which have been obtained by converting the signals c and d in the present embodiment.

Figure 6B:
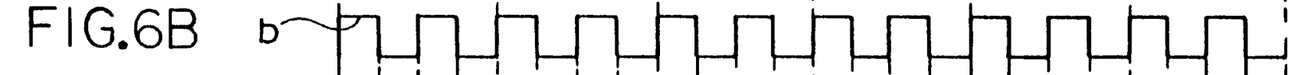
Figure 6C:
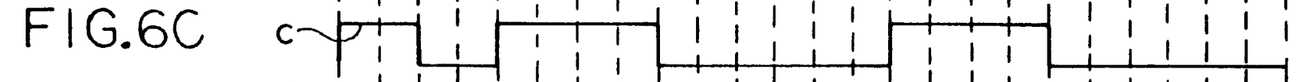
Figure 6D:
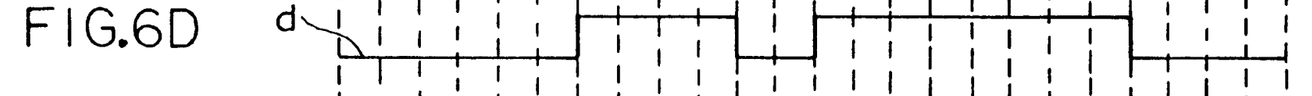

In other words, the conversion controlling section 35 outputs a clock signal shown as a clock signal b in FIG. 6B whose frequency becomes 4 times the frequency of the clock signal at the time of recording at the normal recording density of 300 dpi shown as the clock signal a in FIG. 6A.

The converted dot data are sent to the data latch 39 composed of a memory, such as FIFO (First In First Out), synchronizing with the clock signal, and the dot data are transmitted to the printer engine 3 through the selector 40. Then, ON/OFF operation of the laser beam is controlled.

Figure 6E:
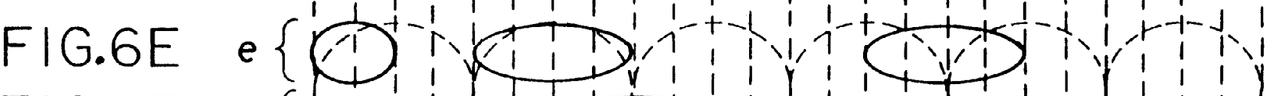
Figure 6F:
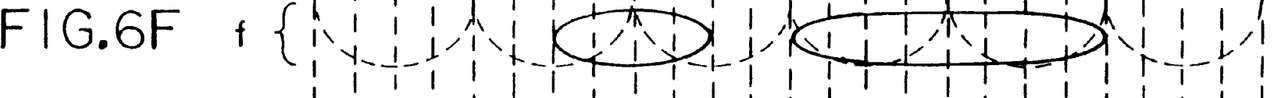
Figure 6G:
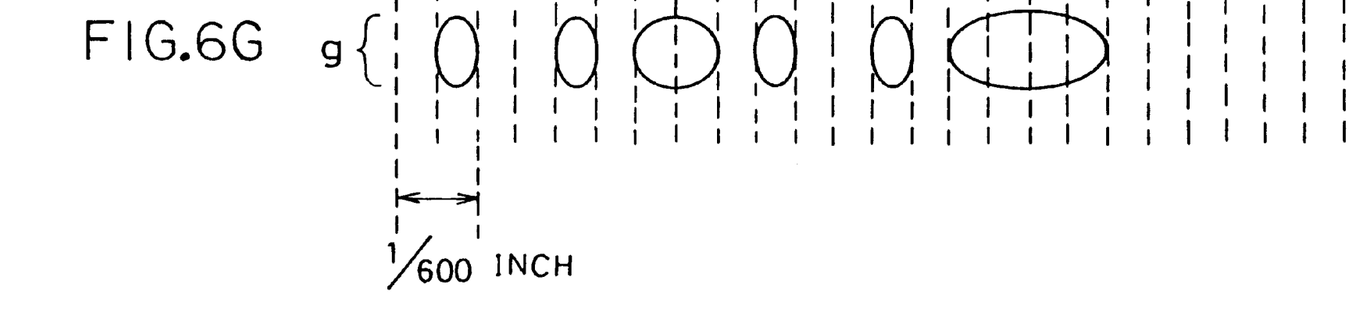

As a result, after image signals which represent certain adjoining two dot data rows (600 dpi) in the horizontal scanning direction which is shown as the signals c and d in FIG. 6 are sampled as one group composed of 4 dots indicated by broken lines in the dot patterns e and f in FIGS. 6E and 6F, is converted according to the above-mentioned conversion patterns, the converted image signals are stored in the printer engine 3 at a dot size shown by the dot pattern g in FIG. 6(g).

Here, in FIGS. 6A–6G, a conversion pattern adopted in a section (1) is FIG. 5(b), a conversion pattern adopted in a section (2) is FIG. 5(m), a conversion pattern adopted in a section (3) is FIG. 5(e), a conversion pattern adopted in a section (4) in FIG. 5(n), a conversion pattern adopted in a section (5) in FIG. 5(o), and a conversion pattern adopted in a section (6) is FIG. 5(a).

Figures 7A, 7B:
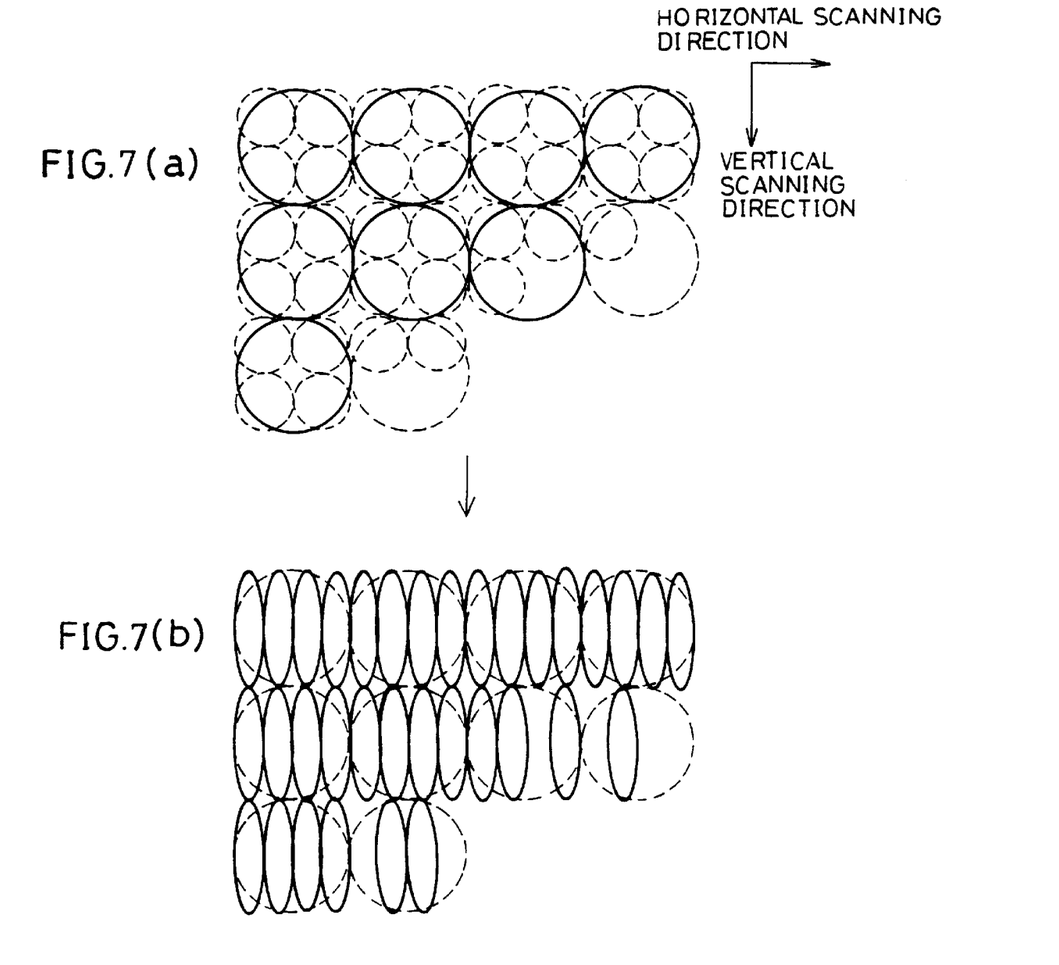
FIG. 7(a) is a schematic drawing of recording dots obtained by conversion into 300 dpi×300 dpi.
FIG. 7(b) is a schematic drawing of recording dots obtained by conversion into 300 dpi×pseudo 1200 dpi in the present embodiment.
Figures 8A, 8B:
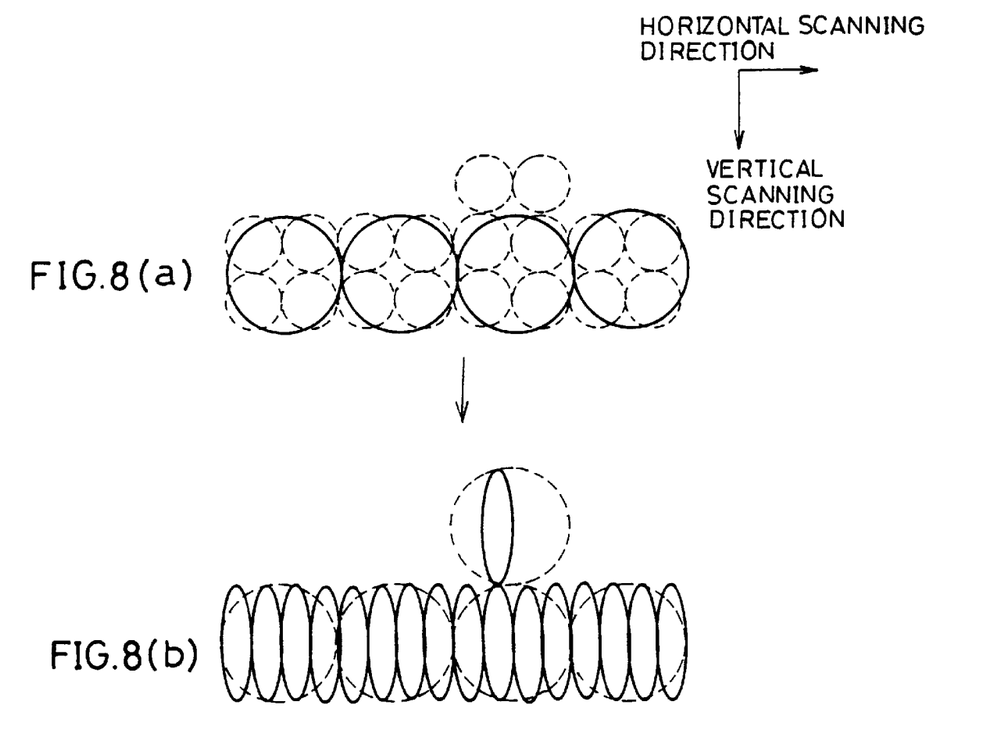
FIG. 8(a) is a schematic drawing of recording dots obtained by conversion into 300 dpi×300 dpi.
FIG. 8(b) is a schematic drawing of recording dots obtained by conversion into 300 dpi×pseudo 1200 dpi in the present embodiment.
Figure 9A:
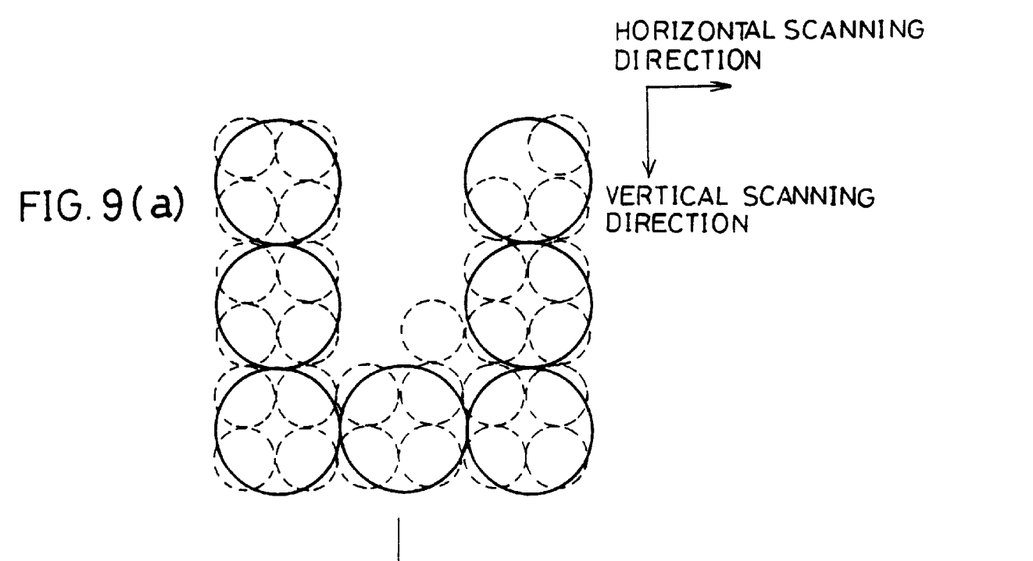
FIG. 9(a) is a schematic drawing of recording dots obtained by conversion into 300 dpi×300 dpi.

Each concrete example of images formed by converting image data as mentioned above are shown in FIG. 7(b), FIG. 8(b) and FIG. 9(b). Here, FIG. 7(a), FIG. 8(a) and FIG. 9(a) are printing examples when image data of 600 dpi×600 dpi are converted to 300 dpi×300 dpi so as to be outputted. In these cases, in FIG. 7(a), for example, a small circle indicated by broken lines are dot data of 600 dpi, and the dot data are sampled as one group composed of 4 dots as mentioned above. In the case where not less than 3 dot printing data exist in the group, as shown by a big circle indicated by a solid line, the big circle portion is printed as dots. Meanwhile, in the case where only not more than 2 dot printing data exist in the group, as indicated by a big circle of broken lines, its portion is not printed as dots. In such a way, the image data of 600 dpi×600 dpi are converted to 300 dpi×300 dpi (hereinafter, referred to as a conventional method).

FIGS. 7(a) and 7(b) are enlarged schematic drawings of a recording state of image data for a diagonal line at 600 dpi×600 dpi. As shown in FIG. 7(a), when recording is carried out by the conventional method, a diagonal line portion has a shape of stairs with a dot size of 300 dpi, and dot data of 600 dpi which are not surrounded by a solid line are completely thinned out so as not to exist. For this reason, the diagonal line portion is recorded with it being jagged.

Meanwhile, in the present embodiment, as shown in FIG. 7(b), dots which also correspond with the thinned out dot data of 600 dpi are printed. Therefore, since the diagonal line portion is recorded as an image which has more faithfully reflected the dot data of 600 dpi, in the case where the diagonal line portion is viewed, jaggedness is hardly felt.

FIGS. 8(a) and 8(b) show a recording state in the case where a singular point composed of 2 dots with recording density of 600 dpi exists on a line extended in the horizontal scanning direction. With recording by the conventional method shown in FIG. 8(a), the singular point is completely thinned out so as to disappear. On the contrary, in the recording state in the present embodiment shown in FIG. 8(b), data of the singular point are completely recorded, and are recorded as an image which is more faithful to the dot data of 600 dpi.

FIGS. 9(a) and 9(b) shows a recording state of an acute angle portion. With recording by the conventional method shown in FIG. 9(a), since dot data of 600 dpi which are not surrounded by a solid line are thinned out so as to disappear, dot composing an interior angle portion of the acute angle are not recorded, and as a result, the interior angle portion becomes larger.

Figure 9B:
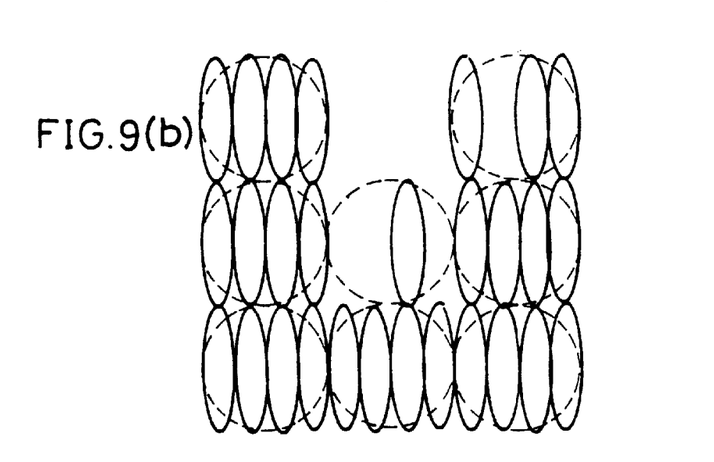
FIG. 9(b) is a schematic drawing of recording dots obtained by conversion into 300 dpi×pseudo 1200 dpi in the present embodiment.

Meanwhile, with a recording state in the present embodiment shown in FIG. 9(b), since the above disappeared dot data are also converted into printing data, its image becomes more faithful to the dot data of 600 dpi.

As mentioned above, in the present embodiment, in the case where image data with recording density of 600 dpi which have been created in the host computer 32 are outputted to the laser printer 30 with resolution of 300 dpi so as to be recorded, the image data are converted so as to have recording density which is same as the resolution of the laser printer 30 in the vertical scanning direction, and are converted so as to have recording density of 1200 dpi which is larger than the resolution of the laser printer 30 in the horizontal scanning direction. Thereafter, an image is formed.

In this way, in the horizontal scanning direction, conversion in the conventional manner such that recording density becomes equal to resolution in the vertical scanning direction is not carried out, but image data are converted so as to have higher density, thereby making it possible to form an image with further improved printing quality without using an excellent recording apparatus with high resolution.

As mentioned above, particularly in the case where recording density in the vertical scanning direction is ½, when image data are converted so as to have doubled recording density in the horizontal recording direction, an arrangement of dots to be actually printed are different, but a number of dots per unit area after and before conversion are same. For this reason, conversion of data, which more faithfully reflects a difference of image data per dot before conversion, can be carried out. As a result, printing is possible at higher quality.

Furthermore, in the present embodiment, since image data transmitted from the host computer 32 are compressed so as to be stored in the memory 36, capacity of the memory 36 can be small. Therefore, this arrangement can also make whole costs lower.

EMBODIMENT 2

Figure 10:
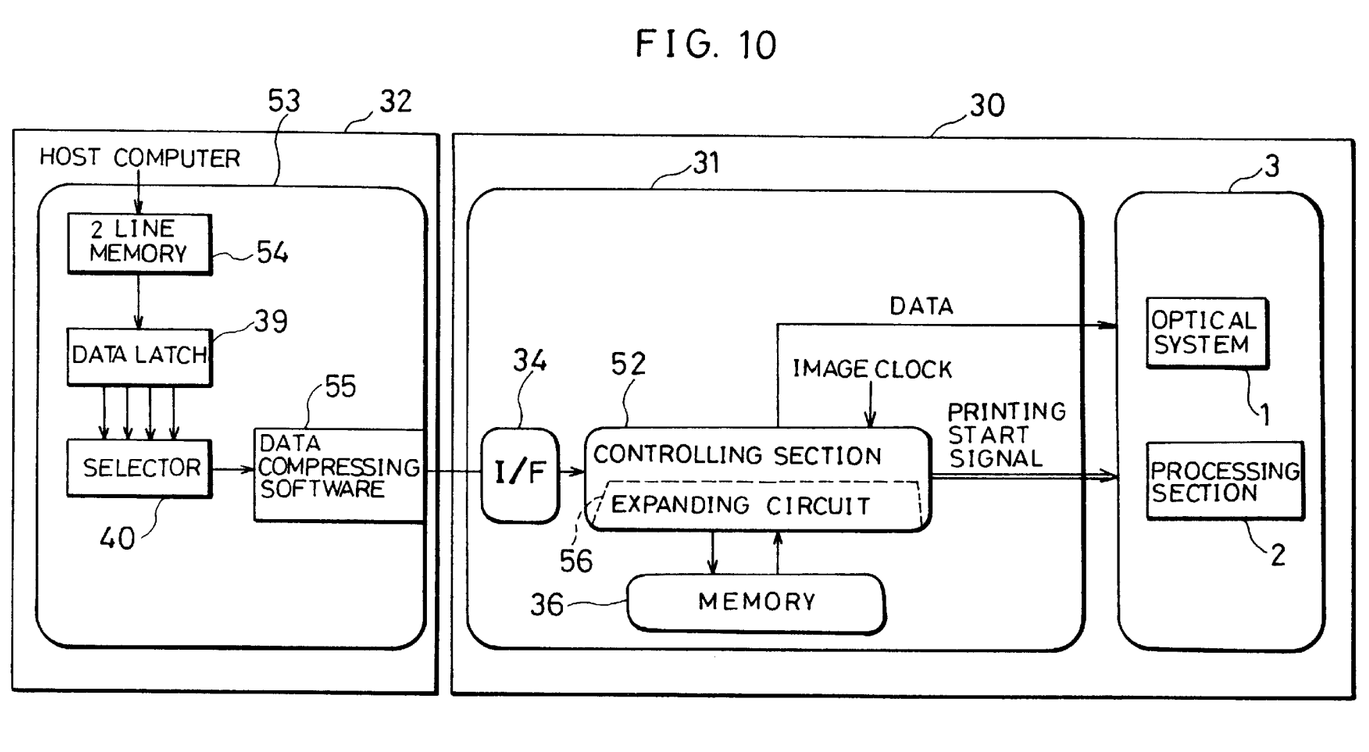
FIG. 10 is a block diagram which shows an arrangement of control in an image forming apparatus of another embodiment of the present invention.

The following will discuss another embodiment of the present invention referring to FIG. 10. Here, for convenience of explanation, those members that have the same arrangement and functions, and that are described in the aforementioned embodiments are indicated by the same reference numerals and the description thereof is omitted.

As shown in FIG. 10, an image forming apparatus of the present embodiment is arranged such that a function for converting image data which have been converted data in the conversion controlling section 35 in the aforementioned embodiment is included in a printer driver 53 which is provided in a host computer 32.

The printer driver 53 is provided with a two-line memory 54, such as FIFO, for capturing image data which have been created in the host computer 32 for each two lines, a data latch 39 and a selector 40 which are similar to the aforementioned embodiment, and a compressing software 55 as data compressing means for compressing image data outputted from the selector 40 so as to output the compressed image data.

Meanwhile, in the printer controller 51 of the laser printer 30, a data expanding circuit 56 is included in a controlling section 52 where image data transmitted from the host computer 32 through an interface 34 are inputted.

In the above arrangement, image data (600 dpi) created in the host computer 32 are transmitted to the printer driver 53 according to outputting command of the host computer 32.

The data of 600 dpi transmitted to the printer driver 53 are successively captured by the two-line memory 54, and similarly to the aforementioned embodiment, two dots of 1st line data and two dots of 2nd line data are sampled so as to be converted to data of pseudo 1200 dpi based upon the conversion pattern per one group composed of four dots.

After the converted data are inputted to the data compressing software 55 through the data latch 39 and the selector 40 so as to be compressed in the data compressing software 55, the compressed data are transmitted to the printer controller 31 of the laser printer 30 at a high speed.

The transmitted data are successively stored in a memory 36 through the controlling section 52. After storing of the data to the memory 36 is completed, the controlling section 52 outputs a printing start signal to a printer engine 3. A warm-up of the printer engine 3 is started and at the same time, the compressed data of pseudo 1200 dpi stored in the memory 36 are called in the prescribed order. Then, after the called data are expanded so as to return to an original data (1200 dpi×300 dpi) in the data expanding circuit 56, the expanded data are synchronized with a clock signal with frequency which is 4 times frequency at the time of normal recording at recording density of 300 dpi so as to be outputted to the printer engine 3.

As a result, in the printer engine 3, its image is recorded at recording density of 1200 dpi in the horizontal scanning direction and 300 dpi in the vertical scanning direction.

As mentioned above, in the present embodiment, recording density of dot data is converted in the printer driver 53 of the host computer 32, and the data are compressed so as to be transmitted to the laser printer 30.

For this reason, a burden of the laser printer 30 at the time of data conversion is decreased, so it is not necessary to specially provide an exclusive memory, etc. for converting data in the laser printer 30.

As a result, in the case of an arrangement that a plurality of the laser printers 30 are connected to the host computer 32, the respective laser printers 30 can be arranged at a lower price, thereby making it possible to reduce whole cost.

In addition, since compressed data are transmitted from the host computer 32 to the laser printer 30, a communicating time is shorten and capacity of a memory which is required in the case where compressed data are temporarily stored in the laser printer 30 becomes small. This can also make it possible to further lower the whole cost to a low price.

Here, the present invention is not limited to the abovementioned embodiments, so embodiments can be variously changed within the scope of the present invention. For example, the above discussed the case where recording data of 600 dpi are recorded in a recording apparatus with resolution of 300 dpi, but a combination of recording density of recording data are resolution of a recording apparatus is arbitrary, so a number, conversion patterns, etc. of data to be extracted as one group at the time of data conversion can be set according to the combination.

In addition, in embodiment 2, a host computer carried out bit processing in a unit of 2 bits, but it may mutually transmit data for two lines to a laser printer as process of a byte unit (8 bits) so that the laser printer processes data in a unit of 2 bits. As a result, allotment of processing in the host computer and in the laser printer can be also decided so that processing of software in a host computer is simplified for processing at a high speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A conversion device, comprising:

conversion means for converting original dot data that is representative of an input image, by doubling a recording density of the original dot data in a horizontal scanning direction and halving a recording density of the original dot data in a vertical scanning direction, wherein the original dot data is divided into groups of dots, each group including 2 dots in the horizontal scanning direction×2 dots in the vertical scanning direction, and each group is converted into 4 dots in the horizontal scanning direction×1 dot in the vertical scanning direction such that the converted dot data does not include three immediately adjacent recording dots in the horizontal scanning direction except in a case where, before the conversion, the 4 dots belonging to the same group are all recording dots.

2. The conversion device as defined in claim 1, wherein:

if, before the conversion, only one of the 4 dots belonging to the same group is a recording dot, the conversion means converts the 4 dots so that each dot on an end is a non-recording dot and one of the remaining two middle dots is a recording dot.

3. The conversion device as defined in claim 1, wherein:

if, before the conversion, only one of the 4 dots belonging to the same group is a non-recording dot, the conversion means converts the 4 dots so that each dot on an end is a recording dot and one of the remaining two middle dots is a non-recording dot.

4. The conversion device as defined in claim 1, wherein:

the recording densities of the original dot data in the horizontal scanning direction and in the vertical scanning direction are 600 dpi or lower.

5. The conversion device as defined in claim 4, wherein:

the converted dot data has a recording density of 1200 dpi or lower in the horizontal scanning direction.

6. The conversion device as defined in claim 4, wherein:

the converted dot data has a recording density of 300 dpi or lower in the vertical scanning direction.

7. An image forming device, comprising:

the conversion device as defined in claim 1; and an image forming section for forming an image by projecting a laser on a photosensitive body in a horizontal scanning direction and in a vertical scanning direction of the photosensitive body, wherein:

the laser is turned on and off only in the horizontal scanning direction at 4 times a frequency before the conversion, so as to form an image represented by the converted dot data produced by the conversion device.

8. The image forming device as defined in claim 7, wherein:

the laser is applicable to a recording density of 300 dpi or lower both in the horizontal scanning direction and in the vertical scanning direction.

* * * * *